US010237712B2

(12) United States Patent
Gopalakrishnan et al.

(10) Patent No.: US 10,237,712 B2
(45) Date of Patent: Mar. 19, 2019

(54) IN-FIELD WIRELESS ACCESS TO SMART INSTRUMENTS USING BLUETOOTH LOW ENERGY

(71) Applicant: Honeywell International, Inc., Morris Plains, NJ (US)

(72) Inventors: Venkateswaran Chittoor Gopalakrishnan, Calicut (IN); Joseph Pane, North Wales, PA (US); Sharath Babu Malve, Rangareddy District (IN); Amol Gandhi, Bangalore (IN); Paul Dooner, Vancouver (CA)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/177,217

(22) Filed: Jun. 8, 2016

(65) Prior Publication Data
US 2017/0359675 A1    Dec. 14, 2017

(51) Int. Cl.
| H04B 7/00 | (2006.01) |
| H04W 4/80 | (2018.01) |
| H04B 1/3827 | (2015.01) |
| H04L 29/08 | (2006.01) |
| H04L 29/06 | (2006.01) |

(52) U.S. Cl.
CPC ............ *H04W 4/80* (2018.02); *H04B 1/3833* (2013.01); *H04L 67/12* (2013.01); *H04L 69/08* (2013.01)

(58) Field of Classification Search
CPC .............................. H04W 4/008; H04B 1/3833
USPC ....................................................... 455/41.2
See application file for complete search history.

(56) References Cited

U.S. PATENT DOCUMENTS

| 8,406,220 | B2* | 3/2013 | McLaughlin | H04L 45/00 370/351 |
| 9,065,813 | B2* | 6/2015 | Kolavennu | H04W 76/14 |
| 9,080,683 | B2* | 7/2015 | Carter | F16K 37/0075 |
| 9,405,285 | B2* | 8/2016 | Powell | G05B 19/0426 |
| 2010/0190442 | A1* | 7/2010 | Citrano, III | G05B 19/4185 455/41.2 |

(Continued)

FOREIGN PATENT DOCUMENTS

WO    2016107981 A1    7/2016

OTHER PUBLICATIONS

Honeywell International Inc., "Using Honeywell's Field Device Configurator for Simple and Efficient Instrument Maintenance," Aug. 2011, pp. 1-6, publisher Honeywell International Inc., Morris Plains, NJ.

(Continued)

*Primary Examiner* — April G Gonzales (57) ABSTRACT

This disclosure provides various ways to enable a BLUETOOTH Low Energy (BLE) communication capability for a field instrument. An apparatus is configured to perform a method for providing BLE communication capability to a legacy field instrument in an industrial control system. The method includes receiving, by a BLE adapter coupled to the field instrument, information from the field instrument according to a protocol that is native to the field instrument. The method includes converting, by the BLE adapter, the information into a BLE communication protocol. The method includes transmitting, by the BLE adapter, the converted information to an external device over a BLE communication link.

18 Claims, 6 Drawing Sheets

(56) References Cited

U.S. PATENT DOCUMENTS

| | | | | |
|---|---|---|---|---|
| 2015/0053144 A1* | 2/2015 | Bianchi | ............... | A01K 27/001 |
| | | | | 119/720 |
| 2015/0276432 A1* | 10/2015 | Repyevsky | .......... | G05B 19/048 |
| | | | | 340/870.03 |
| 2016/0180620 A1* | 6/2016 | Eyring | ............... | G07C 9/00031 |
| | | | | 235/382 |
| 2016/0241999 A1* | 8/2016 | Chin | .................... | H04W 4/021 |
| 2016/0315982 A1* | 10/2016 | Wallace | ............. | H04L 65/4076 |

OTHER PUBLICATIONS

Emerson Process Management, "475 Field Communicator," Product Data Sheet, May 2013, 8 pages, publisher Emerson Process Management, Eden Prairie, MN.

Venkateswaran Chittoor Gopalakrishnan, et al., "In-Field Wireless Access to Smart Instruments Using Bluetooth Low Energy," U.S. Appl. No. 15/177,217, filed Jun. 8, 2016, 28 pages.

Venkateswaran Chittoor Gopalakrishnan, et al., "Mobile Application with Voice and Gesture Interface for Field Instruments," U.S. Appl. No. 15/334,117, filed Oct. 25, 2016, 34 pages.

Longfei Chen, et al., "Bluetooth Low Energy Based Emergency Backup and Recovery Solution in an Industrial Controller," U.S. Appl. No. 15/279,376, filed Sep. 28, 2016, 34 pages.

\* cited by examiner

IN-FIELD WIRELESS ACCESS TO SMART INSTRUMENTS USING BLUETOOTH LOW ENERGY

TECHNICAL FIELD

This disclosure is generally directed to industrial control systems. More specifically, this disclosure is directed to a system and method for in-field wireless access to smart instruments using BLUETOOTH low energy.

BACKGROUND

In manufacturing process industries, technicians use handheld communicators, such as a HONEYWELL field device configurator (FDC) and an EMERSON 475 field communicator, to access field transmitters (also referred to as "smart transmitters") that use industrial protocols (such as Highway Addressable Remote Transducer (HART) and FOUNDATION FIELDBUS (FF) protocols) in the field. Many manufacturing plants or other industrial facilities have remote areas, such as tank farms, water treatment facilities, well heads, remote platforms, and pipelines; and the field instruments within these industrial facilities are installed at difficult to access or hazardous locations. In order to use the handheld communicator, the technician needs to physically reach the field instrument at such locations. In order to reach these locations, the field technician could climb a ladder or crawl through a crawlspace. Not only is the field technician subjected to inconvenience due to the difficulty in accessing field instruments and in connecting the handheld communicator to field instruments via a wire connector (e.g., alligator clips), but also, the field technician is subjected to carrying multiple handheld devices. This approach of accessing a field instrument leads to operational delays, higher costs, and has potential failure modes.

For some use cases, the field technicians need to carry other portable devices in addition to existing handheld communicators. As a use case example, some field issues are resolved by having the field technician take a photo of a field instrument or of the local display content on the display of the field instrument. Current handheld communicators do not provide this camera capability. As a result, a mobile device with a camera has been utilized to address this need, which means for image capturing purposes, the field technician is subjected to carrying yet another device to hazardous locations. As another example, some technicians rely on information relayed from a control room over a walkie-talkie, which is another additional handheld device that technicians need to carry.

Field instruments that use industrial protocols, such as a HART communication protocol, have to operate within a current budget of less than 3.8 milliamperes (mA) in order work with (for example, transmit and receive) 4-20 mA signals. This current budget makes it difficult to add wireless connectivity, which requires more current for transmit and receive operations.

SUMMARY

This disclosure provides a system and method for in-field wireless access to smart instruments using BLUETOOTH Low Energy (BLE).

In a first example, a method for providing BLE communication capability to a legacy field instrument in an industrial control system is provided. The method includes receiving, by a BLE adapter coupled to the field instrument, information from the field instrument according to a protocol that is native to the field instrument. The method includes converting, by the BLE adapter, the information into a BLE communication protocol. The method includes transmitting, by the BLE adapter, the converted information to an external device over a BLE communication link.

In a second example, an apparatus includes a communication interface configured to couple to a field instrument and to receive information from the field instrument according to a protocol that is native to the field instrument. The apparatus includes a BLE transceiver. The apparatus includes at least one computer processor operably coupled to the BLE transceiver. The at least one computer processor is configured to convert the information into a BLE communication protocol. The at least one computer processor is configured to control the BLE transceiver to transmit the converted information to an external device over a BLE communication link.

In a third example, a system includes a field instrument configured to operate in response to control signals received from an industrial automation controller. The field instrument includes an application processor configured to output information including transmitter parameters of the field instrument. The field instrument also includes a BLE transceiver connected to the application processor and configured to transmit the information to an external device over a BLE communication link and receive BLE signals from the external device over the BLE communication link.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 10, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
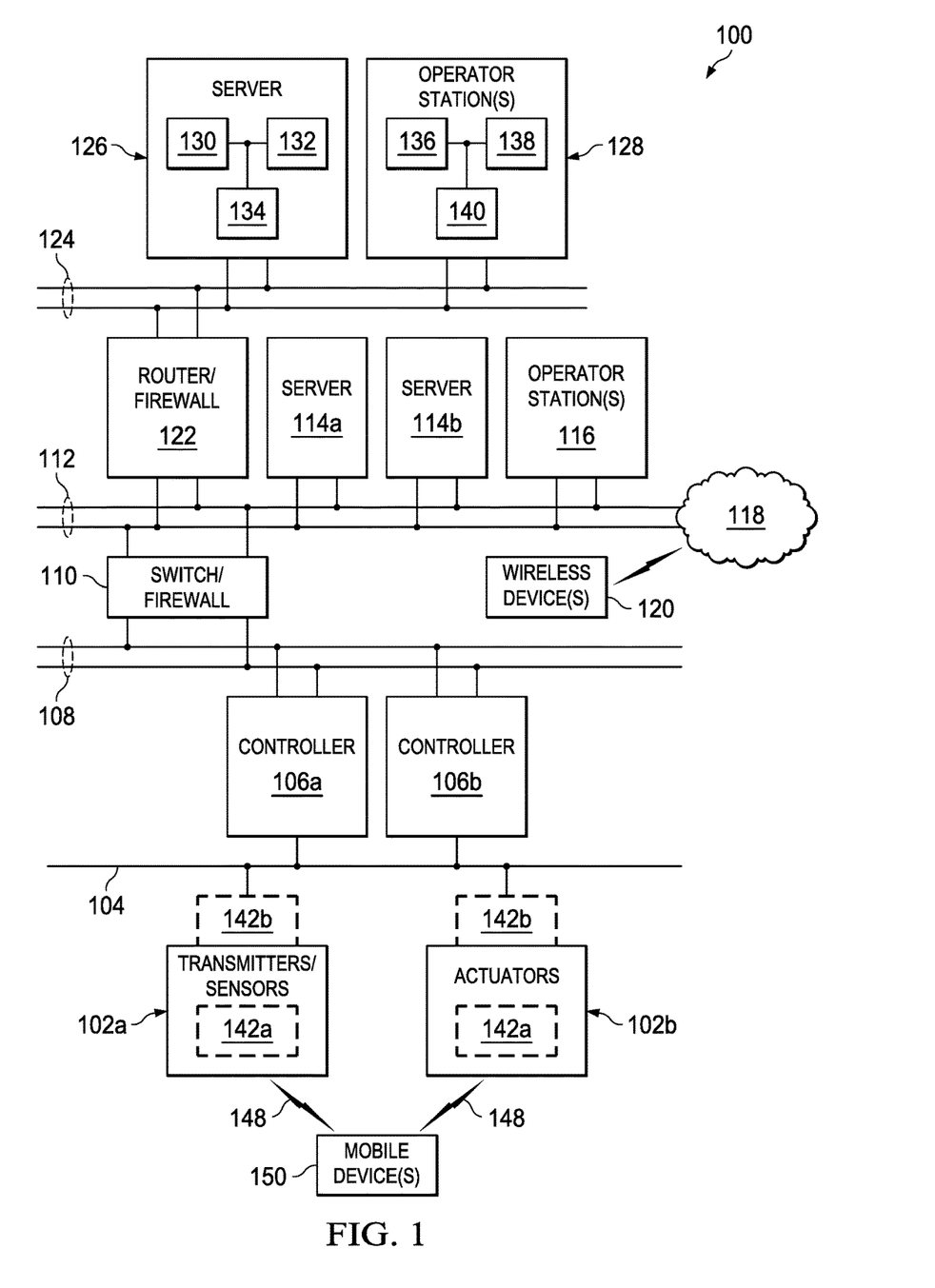
FIG. 1 illustrates an example industrial process control and automation system according to this disclosure.

FIG. 1 illustrates an example process control system 100 according to this disclosure. In this embodiment, the process control system 100 includes various components that facilitate production or processing of at least one product or other material, such as one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, level, or flow rate. The actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system. Also, a process system may generally represent any system or portion thereof configured to process one or more products or other materials in some manner. In general, field instruments either provide inputs to the control system from the process (to be controlled) or provide outputs from the control system to the process. In this embodiment, the measurements provided by the sensors 102a are sent (as inputs) to the process control system 100 by transmitters. In this context, the sensor is part of the transmitter. For example, a pressure transmitter includes a pressure sensor; a temperature transmitter includes a temperature sensor. As such, herein, the sensor 102a is also referred to as a "transmitter/sensor." In this embodiment, actuators 102b provide outputs to the process (to be controlled) in response to receiving the control signals outputted from the process control system 100. A valve is an example of an actuator. These transmitters/sensors 102a and actuators 102b are commonly referred to as field instruments.

At least one communication interface 104 is coupled to the transmitters/sensors 102a and actuators 102b. The communication interface 104 facilitates interaction with the transmitters/sensors 102a and actuators 102b. For example, the communication interface 104 could transport measurement data from the transmitters/sensors 102a and provide control signals to the actuators 102b. The communication interface 104 could represent any suitable number of communication interfaces in the automated industrial process control industry, point-to-point circuitry, network circuitry, or combination of networks. As particular examples, the communication interface 104 could represent an Ethernet network, an electrical signal interface (such as a HART or FOUNDATION FIELDBUS network), a pneumatic control signal interface, or any other or additional type(s) of network(s) or communication interfaces(s).

One or more controllers 106a-106b are coupled to the communication interface 104. The controllers 106a-106b may, among other things, use the measurements from the transmitters/sensors 102a to control the operation of the actuators 102b. For example, the controllers 106a-106b could receive measurement data from the transmitters/sensors 102a and use the measurement data to generate control signals for the actuators 102b. Each of the controllers 106a-106b includes any suitable structure for interacting with the transmitters/sensors 102a and controlling the actuators 102b. The controllers 106a-106b could, for example, represent proportional-integral-derivative (PID), multivariable, or other types of controllers. As a particular example, each of the controllers 106a-106b could represent a computing device running a real time operating system. In some embodiments, the controllers 106a-106b could denote a redundant pair of controllers.

Two networks 108 are coupled to the controllers 106a-106b. The networks 108 facilitate interaction with the controllers 106a-106b, such as by transporting data to and from the controllers 106a-106b. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

One or more servers 114a-114b are coupled to the networks 112. The servers 114a-114b perform various functions to support the operation and control of the controllers 106a-106b, transmitters/sensors 102a, and actuators 102b. For example, the servers 114a-114b could log information collected or generated by the controllers 106a-106b, such as measurement data from the transmitters/sensors 102a or control signals for the actuators 102b. The servers 114a-114b could also execute applications that control the operation of the controllers 106a-106b, thereby controlling the operation of the actuators 102b. In addition, the servers 114a-114b could provide secure access to the controllers 106a-106b. Each of the servers 114a-114b includes any suitable structure for providing access to, control of, or operations related to the controllers 106a-106b. Each of the servers 114a-114b could, for example, represent a computing device running a MICROSOFT WINDOWS operating system.

One or more operator stations 116 are coupled to the networks 112. The operator stations 116 represent computing or communication devices providing user access to the servers 114a-114b, which could then provide user access to the controllers 106a-106b (and possibly the transmitters/sensors 102a and actuators 102b). As particular examples, the operator stations 116 could allow users to review the operational history of the transmitters/sensors 102a and actuators 102b using information collected by the controllers 106a-106b and/or the servers 114a-114b. The operator stations 116 could also allow the users to adjust the operation of the transmitters/sensors 102a, actuators 102b, controllers 106a-106b, or servers 114a-114b. In addition, the operator stations 116 could receive and display warnings, alerts, or other messages or displays generated by the controllers 106a-106b or the servers 114a-114b. Each of the operator stations 116 includes any suitable structure for supporting user access and control of the system 100. Each of the operator stations 116 could, for example, represent a computing device running a MICROSOFT WINDOWS operating system.

In this example, the system 100 also includes a wireless network 118, which can be used to facilitate communication with one or more wireless devices 120. The wireless network 118 may use any suitable technology to communicate, such as radio frequency (RF) signals. Also, the wireless devices 120 could represent devices that perform any suitable functions. The wireless devices 120 could, for example, represent wireless sensors, wireless actuators, and remote or portable operator stations or other user devices.

At least one router/firewall 122 couples the networks 112 to two networks 124. The router/firewall 122 includes any suitable structure for providing communication between networks, such as a secure router or combination router/firewall. The networks 124 could represent any suitable networks, such as a pair of Ethernet networks or an FTE network.

In this example, the system 100 includes at least one additional server 126 coupled to the networks 124. The server 126 executes various applications to control the overall operation of the system 100. For example, the system 100 could be used in a processing plant or other facility, and the server 126 could execute applications used to control the plant or other facility. As particular examples, the server 126 could execute applications such as enterprise resource planning (ERP), manufacturing execution system (MES), or any other or additional plant or process control applications. The server 126 includes any suitable structure for controlling the overall operation of the system 100.

One or more operator stations 128 are coupled to the networks 124. The operator stations 128 represent computing or communication devices providing, for example, user access to the servers 114a-114b, 126. Each of the operator stations 128 includes any suitable structure for supporting user access and control of the system 100. Each of the operator stations 128 could, for example, represent a computing device running a MICROSOFT WINDOWS operating system.

In particular embodiments, the various servers and operator stations may represent computing devices. For example, each of the servers 114a-114b, 126 could include one or more processors 130 and one or more memories 132 for storing instructions and data used, generated, or collected by the processor(s) 130. Each of the servers 114a-114b, 126 could also include at least one network interface 134, such as one or more Ethernet interfaces. Also, each of the operator stations 116, 128 could include one or more processors 136 and one or more memories 138 for storing instructions and data used, generated, or collected by the processor(s) 136. Each of the operator stations 116, 128 could also include at least one network interface 140, such as one or more Ethernet interfaces.

Industrial field instruments (for example, transmitters/sensors 102a and actuators 102b) may need to have maintenance or diagnostics performed or need to be configured, reconfigured, monitored, or managed; accordingly, accessing the industrial field instrument is required. The scenario of accessing a field instrument via a handheld communicators can lead to higher costs and lower productivity. More particularly, a typical handheld communicator is a costly purpose-built hardware which can cost thousands of dollars each. Additionally, typical industrial sites have hundreds or thousands of field instruments that perform functions such as measurement functions (e.g., by transmitters/sensors 102a) or controlling output functions (e.g., by actuators 102b such as valves, pumps, or the like) and are part of the overall instrumentation and control equipment. Given that a given handheld communicator may only be connected to one field instrument one at a time, loss of productivity and thus higher labor costs are consequences.

Market dynamics worldwide competition are putting manufacturing plants under intense financial pressure. Fewer staff are expected to operate and maintain more equipment at lower cost, while also delivering higher throughput, higher availability, and higher profits with aging assets. There is a need to make an improvement in the tools that field technicians have in order to save cost, improve safety, and maximize plant operations.

Figure 4:
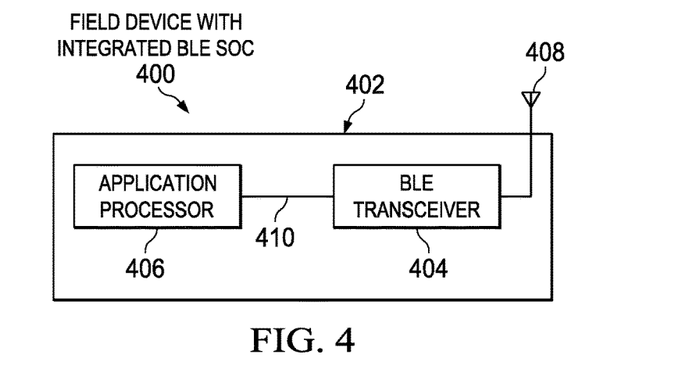
FIGS. 4, 5, 6, and 7 illustrate examples of a BLE enabled field instruments according to this disclosure.
Figure 5:
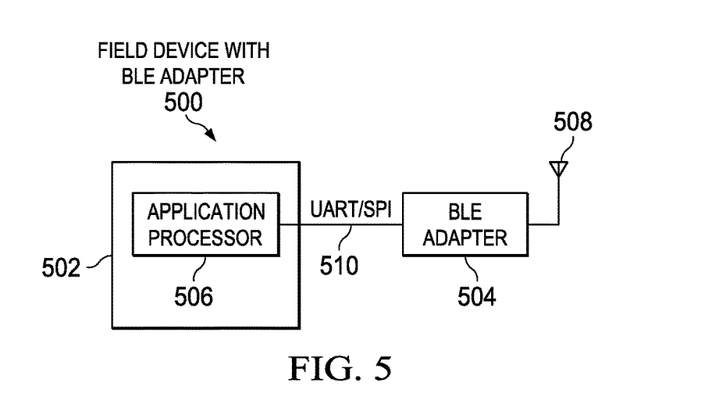
Figure 6:
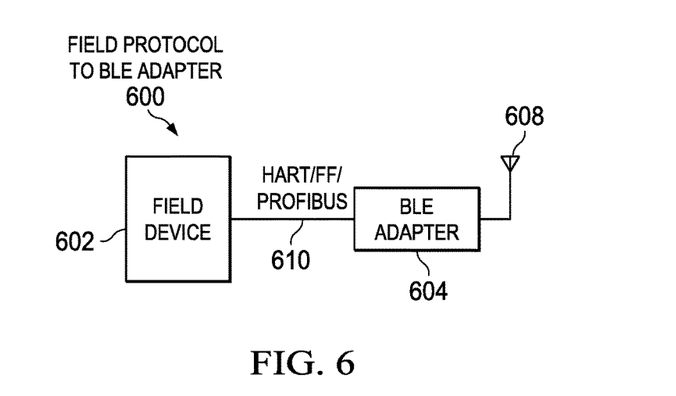

This disclosure provides different ways to enable a BLUETOOTH Low Energy (BLE) capability for a field instrument (for example, transmitters/sensors 102a and actuators 102b) as described more particularly below with reference to FIGS. 4-7. In certain embodiments, the field instrument 102a-102b includes a BLE transceiver 142a on board, as shown in FIG. 4. In certain embodiments, a standalone BLE module interfaces to existing field instruments (for example, legacy field instruments) through serial communication lines, such as a universal asynchronous receiver/transmitter (UART) line or a Serial Peripheral Interface (SPI) line, as shown in FIG. 5. In certain embodiments, a Field Protocol-BLE adapter 142b can connect to a HART, FF, Process Field Bus (PROFIBUS), or other industrial protocol device and can and make its data available over a BLE interface by converting (i.e., translating) BLE packets to field protocol and vice versa, as shown in FIG. 6. Depending on the communication interface capabilities of the existing field instrument, the Field Protocol-BLE adapter 142b could be an alternative to the standalone BLE module or could incorporate features of the standalone BLE module. In addition to the BLE conversion capability, the Field Protocol-BLE adapter 142b could be a Field protocol to Multi Wireless protocol adapter that can communicate on other wireless networking protocols, such as an International Society of Automation (ISA) 100.11A standard protocol and a Wireless HART protocol. Given that legacy industrial field instruments are incapable of BLE communication, certain embodiments of this disclosure make the existing field instruments in the field capable of communicating over a BLE communication link 148 without modification of the existing field instruments.

This disclosure enables a mobile device 150 (for example, a smartphone) to access transmitter parameters over the BLE communication link 148. This wireless BLE access solves the problem of inaccessible locations by enabling wireless access (by the mobile device 150) to transmitter parameters from a convenient location.

Some off the shelf mobile phones and tablets are equipped with BLUETOOTH communication support. BLE native support is present in both ANDROID and iOS operating system enabled devices. In comparison with existing handheld communicators, off the shelf mobile phones and tablets are significantly less costly. The reduced effort needed to access field instruments reduces the labor cost for accessing field instruments to obtain transmitter parameters.

The current handheld communicator based approach of accessing a field instrument is associated with multiple potential failure modes. One potential failure mode associated with the handheld communicator occurs when the field technician cannot effectively obtain an overall status of multiple field instruments by using a conventional handheld communicator, because the conventional handheld communicator limits the field technician to connect to each field instrument one at a time. The failure modes of the conventional handheld communicator based solution are removed by the BLE enabled field instrument of this disclosure in at least the following way: the BLE enabled field instrument is capable of forming a mesh network with other BLE enabled field instruments. Hence, a mobile device can communicate with multiple BLE enabled field instruments (for example, in a time multiplexed manner). Accordingly, each BLE enabled field instrument provides a mobile device 150 or otherwise enables the mobile device 150 to obtain the status from multiple field instruments (for example, transmitters/sensors 102a and actuators 102b) and enables the statuses of those multiple field instruments to be displayed in a consolidated manner.

Another potential failure mode associated with the handheld communicator occurs whenever the end cap of the transmitter is opened, and the openness exposes the field wiring to the environment of the manufacturing plant. That is, a field technician may be required to open the transmitter end cap in order to use the handheld communicator to physically connect to the field instrument terminals of the transmitter. In physically connecting the handheld communicator to the field instrument terminals, there is a risk the field technician may inadvertently disrupt the wires. For example, the field technician may inadvertently short circuit the field instrument terminals to wires connected to a controller of the field instrument, especially if wires of the communication interface 104 are close to the field instrument terminals. The failure modes of the conventional handheld communicator based approach are removed by the BLE enabled transmitter of this disclosure in at least the following way: the transmitter can be accessed without opening the end cap, which solves wiring related problems. The internals components of the transmitter are no longer exposed to the environment of the manufacturing plant, which enhances safety. As a particular non-limiting example, without opening the end cap, an actuator 102b including the BLE transceiver 142a can transmit signals to and receive signals from the mobile device 150 via the BLE communication link 148.

Another potential failure mode associated with the handheld communicator occurs when the technician inadvertently creates a short circuit or when the technician connects the handheld communicator to the field instrument with reversed polarity. Both cases of inadvertence can cause problems and lost time in the field. Another potential failure mode associated with the handheld communicator occurs when the local display of the transmitter is not visible from a distance or is disposed in limited light from the perspective of the field technician, who is not using the handheld communicator and who needs to rely on the local display. These failure modes of the conventional handheld communicator based approach are removed by the BLE enabled transmitter of this disclosure in at least the following ways: the problem of visibility from a distance is solved as the wireless BLE interface makes data available to the mobile device 150 carried by the technician. The mobile device 150 that communicates with BLE enabled field instrument (for example, transmitters/sensors 102a and actuators 102b) will be the only device the technician needs to carry. The mobile device 150 meets the needs of the technician for telecommunication, image or video capture, as well as BLE based communication with the field instruments.

The BLE enabled transmitter operates within the power requirements for wireless communication, namely operating within the current budget of less than 3.8 mA in order to transmit and receive 4-20 mA signals. More particularly, the BLE enabled transmitter operates using a battery. In certain embodiments, the BLE enabled transmitter includes energy storage on the circuit such that stored energy can be consumed when needed. For example, power accumulation circuitry or super capacitors could implement the energy storage on the circuit. Field instruments, such as those that are line powered and do not have tight current budgets, can directly power the wireless subsystem.

Although FIG. 1 illustrates one example of a process control system 100, various changes may be made to FIG. 1. For example, a control system could include any number of sensors, actuators, controllers, servers, operator stations, networks, and HMI applications. Also, the makeup and arrangement of the process control system 100 in FIG. 1 is for illustration only. Components could be added, omitted, combined, or placed in any other suitable configuration according to particular needs. In addition, FIG. 1 illustrates one operational environment in which in-field wireless access to smart instruments using BLUETOOTH Low Energy (BLE) is used. This functionality could be used in any other suitable device or system.

Figure 2:
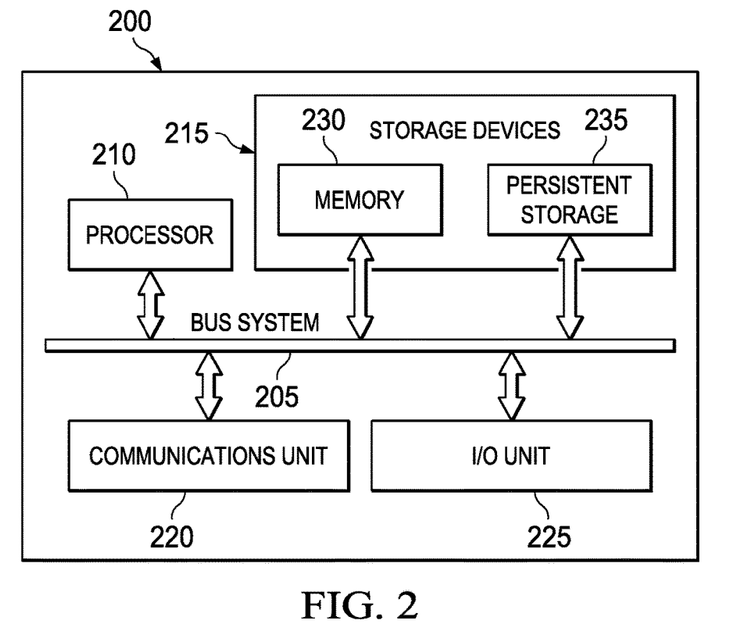
FIG. 2 illustrates an example device supporting in-field wireless access to smart instruments using BLUETOOTH Low Energy (BLE) according to this disclosure.

FIG. 2 illustrates an example device 200 supporting in-field wireless access to smart instruments using BLUETOOTH Low Energy according to this disclosure. The device 200 could, for example, represent a transmitter/sensor 102a or actuator 102b with a BLE transceiver 142a or adapter 142b, or other computing device including the BLE transceiver 142a or otherwise supporting the Field Protocol-BLE adapter 142b or the standalone BLE module. For example, the device 200 could represent the BLE enabled field instrument of FIG. 4, 5, or 6.

As shown in FIG. 2, the device 200 includes a bus system 205, which supports communication between at least one processor 210, at least one storage device 215, at least one communications unit 220, and at least one input/output (I/O) unit 225. The processor 210 executes instructions that may be loaded into a memory 230. The processor 210 may include any suitable number(s) and type(s) of processors or other devices in any suitable arrangement. Example types of processors 210 include microprocessors, microcontrollers, digital signal processors, field programmable gate arrays, application specific integrated circuits, and discrete circuitry.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read only memory, hard drive, Flash memory, or optical disc.

The communications unit 220 supports communications with other systems or devices. For example, the communications unit 220 could include a network interface card or a wireless transceiver facilitating communications over the network 112, 124. The communications unit 220 may support communications through any suitable physical or wireless communication link(s). More particularly, the communications unit 220 could include a transmitter and a receiver for communicating with external devices. According to this disclosure, the communications unit 220 transmits and receives signals according to the BLUETOOTH standard. In certain embodiments, the communications unit 220 could additionally transmit and receive signals according to a field communication protocol, such as any of UART, SPI, HART, wireless HART, FF, or PROFIBUS protocols.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example of a device 200 in which in-field wireless access to smart instruments using BLUETOOTH Low Energy (BLE) is used in an industrial process control and automation system, various changes may be made to FIG. 2. For example, computing devices come in a wide variety of configurations. The device 200 shown in FIG. 2 is meant to illustrate one example type of computing device and does not limit this disclosure to a particular type of computing device.

Figure 3:
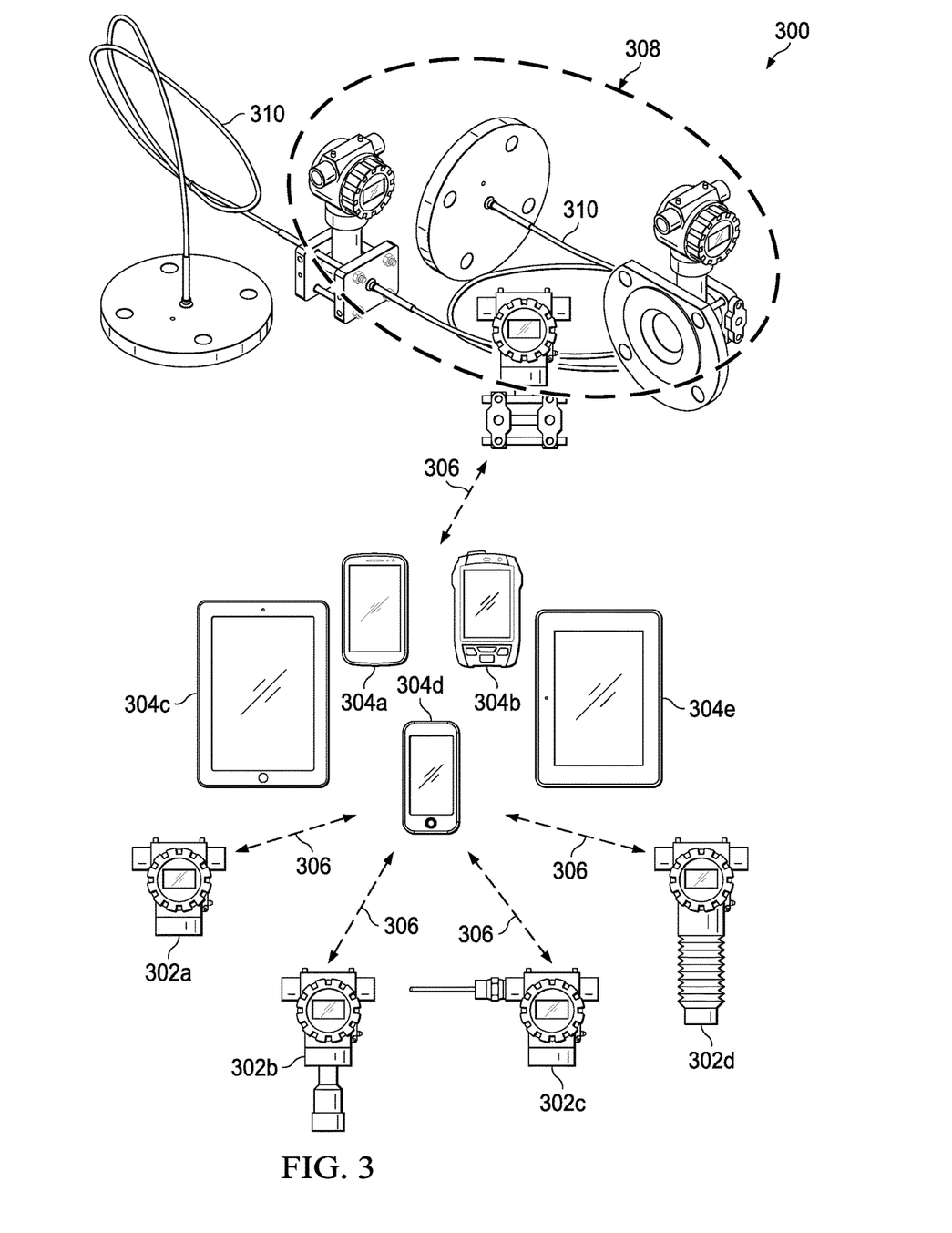
FIG. 3 illustrates an example system for BLE enabled field instruments to provide data to mobile devices over a BLE communication link according to this disclosure.

FIG. 3 illustrates an example system 300 for BLE enabled field instruments to provide data to mobile devices over a BLE communication link according to this disclosure. The system 300 includes one or more BLE enabled field instruments, including a BLE enabled remote meter 302a, multiple BLE enabled pressure transmitters 302b, a BLE enabled temperature transmitter 302c, and a BLE enabled level transmitter 302d. For simplicity, reference number 302 generally refers to any one of the BLE enabled transmitters 302a-302d. The system 300 includes one or more mobile devices, including a smartphone 304a, a personal digital assistant (PDA) 304b, a tablet 304c, a pocket personal computer 304d, or a tablet personal computer 304e. For simplicity, reference number 304 generally refers to any one of the mobile devices 304a-304d.

Note that the BLE enabled transmitter 302 in FIG. 3 could be the same as or similar to corresponding components 102a-102b in FIG. 1. Also note that the mobile device 304 in FIG. 3 could be the same as or similar to the mobile device 150 in FIG. 1. These components in FIG. 3 can operate in the same or similar manner as the corresponding components in FIG. 1.

The BLE enabled transmitter 302 can connect to and communicate with each of the mobile devices 304a-304e via a BLE link 306. In certain embodiments, a group 308 of BLE enabled transmitters can be connected to each other, such as by a communication wire 310; and the group 308 can communicate with a mobile device 304 via a shared BLE link 306. The group 308 is not limited to BLE enabled transmitters 302 that are connected to each other by a wire; the group 308 can include transmitters that connect to another wirelessly.

Although FIG. 3 illustrates one example system 300 for BLE enabled transmitters 302 to provide data to mobile devices 304 over a BLE link 306, various changes may be made to FIG. 3. For example, one mobile device (e.g., the tablet 304c) can communicate with multiple BLE enabled transmitters (e.g., the remote meter 302a and the level transmitter 302d) at the same time over separate BLE links 306.

FIGS. 4, 5, 6, and 7 illustrate examples of a BLE enabled field instrument according to this disclosure. The BLE enabled field instrument has the capability of running a BLE stack and sending BLE packets over the air. FIG. 4 illustrates a field instrument 402 that includes a BLE transceiver 404 in accordance with this disclosure. As a specific example, FIG. 4 shows the field instrument 402 with integrated BLE system-on-chip (SoC) as the BLE transceiver 404. However, the field instrument 402 could include any suitable BLE transceiver 404. The BLE SoC can run a BLE stack and send BLE packets over the air. The BLE transceiver 404 includes an antenna 408 for transmission and reception of BLE signals.

The field instrument 402 includes an application processor 406, which could be the same as or similar to the processor 210 of FIG. 2. The application processor 406 controls the BLE transceiver 404 to transmit and receive signals by sending digital or analog control signals to the BLE transceiver 404 through a hardware interface 410. The application processor 406 can be mounted to the same circuit board (e.g., a printed circuit board (PCB)) as the BLE transceiver 404. The BLE transceiver 404 could be the same as or similar to the BLE transceiver 142a of FIG. 1.

As shown in FIG. 5, the BLE enabled field instrument 500 includes a field instrument 502 with a BLE adapter 504 for communication protocol conversion between wired UART/SPI and wireless BLUETOOTH communication protocols in accordance with this disclosure.

Note that the BLE adapter 504 could be the same as or similar to the BLE adapter 142b of FIG. 1. Also, the BLE adapter 504 in FIG. 5 can operate in the same or similar manner as the BLE transceiver 404 in FIG. 4. Accordingly, the BLE adapter 504 of FIG. 5 includes similar components as BLE transceiver 404 in FIG. 4, such as antennas 408 and 508. For example, the BLE adapter 504 can run a BLE stack and send BLE packets over the air, such as to the mobile device 150. That is, the BLE adapter 504 includes a BLE transceiver.

In order to enable the BLE capability of the field instrument 502, the field instrument 502 is not modified. That is, the field instrument 502 is BLE enabled while connected to the BLE adapter 504. The field instrument 502 includes an application processor 506, which could be the same as or similar to the processor 210 of FIG. 2. The application processor 506 causes the BLE adapter 504 to transmit and receive data signals by transmitting signals to the BLE adapter 504 through a wired communication link 510, such as a UART or SPI hardware interface.

As an operative example, the BLE adapter 504 can receive one or more signals configured according to a BLE communication protocol through the antenna 508, such as one or more signals transmitted over the air by a BLE transmitter of the mobile device 150. The BLE adapter 504 converts the received signal to a wired UART/SPI communication protocol, and then outputs the converted signals. The field instrument 502 receives the UART/SPI converted version of the signals from the BLE adapter 504 via the wired communication link 510. The BLE adapter 504 can transmit the outputted converted signals, or the application processor 506 could retrieve the converted signals from an output of the BLE adapter 504.

As another operative example, the field instrument 502 can output one or more signals configured according to the wired UART/SPI communication protocol. The application processor 506 can transmit the outputted UART/SPI signals to the BLE adapter 504 via the wired communication link 510, or the BLE adapter 504 could retrieve the UART/SPI signals from an output of the field instrument 502. The BLE adapter 504 converts the received signal(s) to BLE communication protocol, and then transmits the converted signal(s) to the mobile device 150.

FIG. 6 illustrates BLE enabled field instrument 600 that includes a field instrument 602 with a BLE adapter 604 for communication protocol conversion between an industrial automation communication protocol (such as HART, FF, or PROFIBUS) and BLUETOOTH communication protocols in accordance with this disclosure.

The BLE adapter 604 could be the same as or similar to the BLE adapter 142b of FIG. 1. The BLE adapter 604 performs a similar function as the BLE adapter 504 of FIG. 5. Note that the field instrument 502 and antenna 508 in FIG. 5 could be the same as or similar to corresponding field instrument 602 and antenna 608 in FIG. 6. That is, the field instrument 602 includes an application processor (AP), similar to the AP 506. These components in FIG. 6 can operate in the same or similar manner as the corresponding components in FIG. 5.

In order to enable the BLE capability of the field instrument 602, the field instrument 602 is not modified. That is, the field instrument 602 is BLE enabled while connected to the BLE adapter 604 via the communication link 610. The communication link 610 can be wired, such as in the case of carrying signal corresponding to a HART communication protocol. The communication link 610 can be wireless, such as in the case of carrying signal corresponding to a wireless HART communication protocol. The communication link 610 can be a link within a two-wire, 4-20 mA wired network, such as a HART network.

In certain embodiments, in addition to BLE conversion capability, the BLE adapter 604 is further configured to convert signals from a field protocol (for example, a wired HART protocol) to a Multi Wireless protocol that can communicate on other wireless networking protocols, such as ISA 100.11A standard protocol and Wireless HART protocol.

Figure 7:
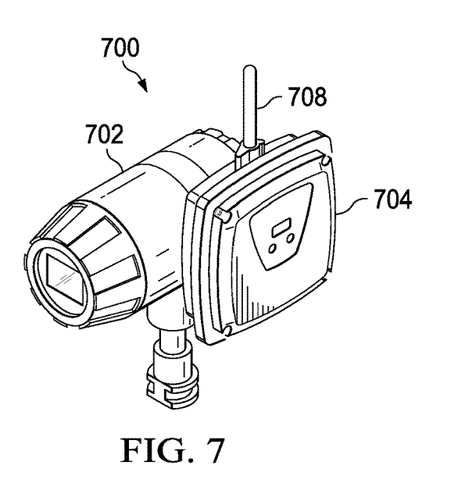

FIG. 7 illustrates a photograph of a BLE enabled field instrument 700 that includes a field instrument 702 with a BLE adapter 704 for communication protocol conversion between BLUETOOTH communication protocols and another communication protocol for which the field instrument 702 is configured according to this disclosure. For example, the BLE enabled field instrument 700 could be the same as the BLE enabled field instrument 500 in FIG. 5 or the BLE enabled field instrument 600 in FIG. 6.

Note that the field instrument 702 could be a legacy field instrument that does not itself communicate via BLUETOOTH communication protocols, but instead uses the BLE adapter 704 for BLE communications. Note that the BLE adapter 704 could be the same as or similar to the BLE adapter 142b of FIG. 1. Also, the BLE adapter 704 in FIG. 7 can operate in the same or similar manner as the BLE transceiver 504 or 604 in FIG. 5 or 6 and can include similar components as BLE transceiver 504 or 604, such as an antenna 708.

Figure 8:
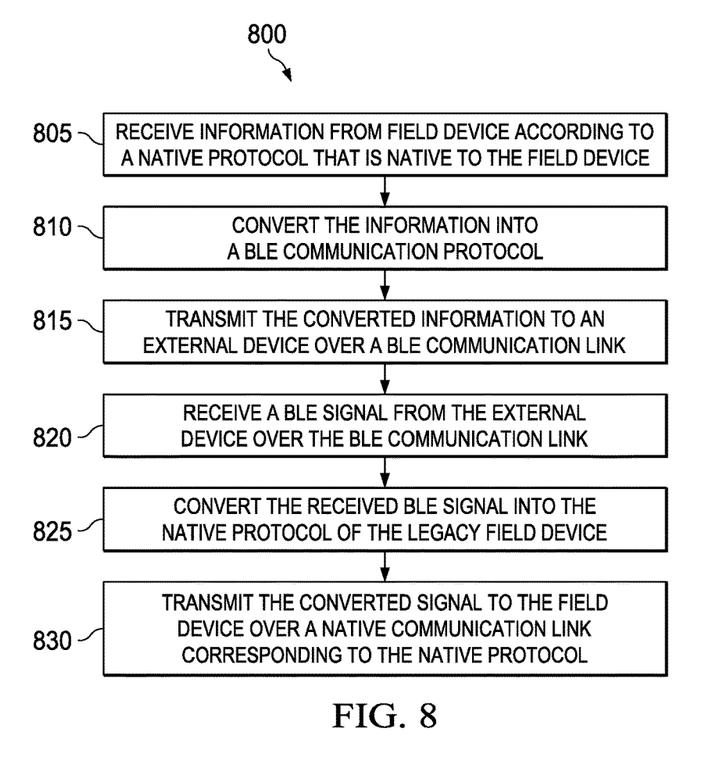
FIG. 8 illustrates an example method for providing BLE communication capability to a legacy field instrument in an industrial control system according to this disclosure.

FIG. 8 illustrates an example method 800 for providing BLE communication capability to a legacy field instrument in an industrial control system according to this disclosure. The method 800 can be performed by a BLE enabled field instrument 500, 600, 700 according to embodiments of this disclosure. For simplicity, the method 800 will be described as being implemented by the BLE enabled field instrument 700.

The method 800 can include coupling the BLE adapter 704 to a legacy field instrument 702. Alternatively, the method 800 can begin in a state with the BLE adapter 704 coupled to the legacy field instrument 702.

In blocks 805-815, the BLE enabled field instrument 700 transmits information from an external device. In block 805, the BLE adapter 704 receives information (e.g., transmitter parameters) from the field instrument 702 according to a native protocol that is native to the field instrument 702. For example, the legacy field instrument 702 could be a HART-based field instrument having a native protocol that is the HART protocol. Similarly, the native protocol could be the FF protocol or a PROFIBUS protocol in the case of a FF-based or PROFIBUS-based legacy field instrument, respectively.

In block 810, the BLE adapter 704 converts the received information into a BLE communication protocol.

In block 815, the BLE adapter 704 transmits the converted information to an external device over a BLE communication link. For example, the BLE adapter 704 establishes the BLE communication link between itself and the external device. The external device can be a mobile device 304a-304d.

In blocks 820-830, the BLE enabled field instrument 700 receives signals from the external device. In block 820, the BLE adapter 704 receives a BLE signal from the external device over the BLE communication link.

In block 825, the BLE adapter 704 converts or translates the received BLE signal into the native protocol of the legacy field instrument 702.

In block 830, the BLE adapter 704 transmits the converted signal to the field instrument over a native communication link 510, 610 corresponding to the native protocol. The native communication link can include a wired hardware interface, such as UART or SPI interfaces 510. That is, the UART protocol corresponds to a UART communication link; and the SPI protocol corresponds to an SPI communication link. In certain embodiments, the native communication link 610 includes a wireless communication link, such as a wireless HART communication link.

Although FIG. 8 illustrates a series of steps, various steps in each figure could overlap, occur in parallel, or occur any number of times.

Figure 9:
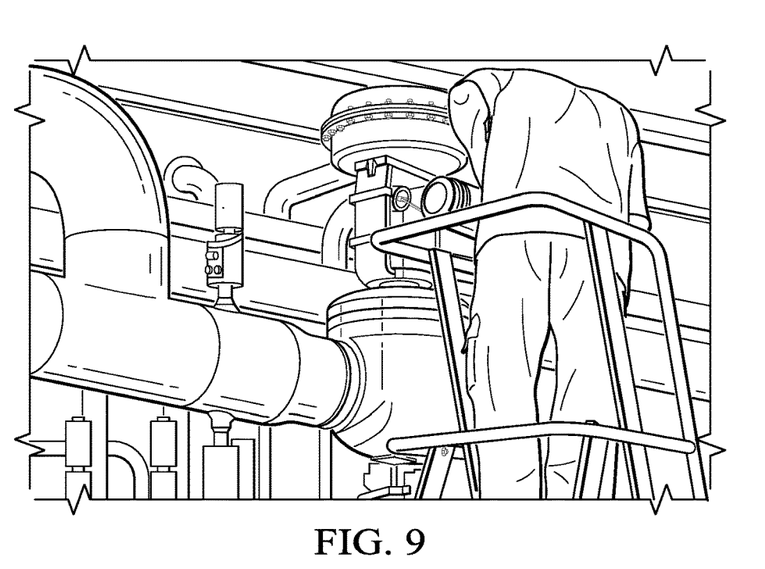
FIG. 9 illustrates a field technician who climbed a ladder in industrial plant in order to reach a legacy field instrument.

FIG. 9 illustrates a field technician who climbed a ladder in industrial plant in order to reach a legacy field instrument for connecting a wire connector of a handheld communicator to the legacy field instrument.

Figure 10:
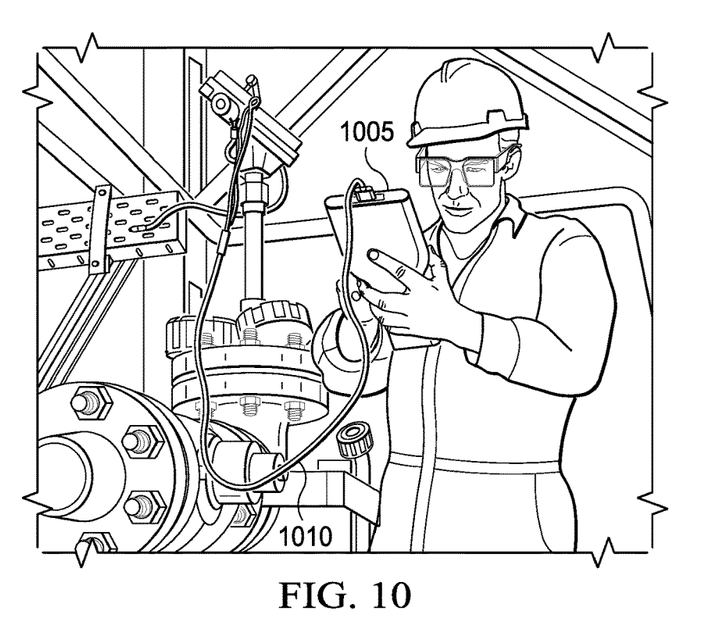
FIG. 10 illustrates a field technician who connected an example handheld communicator to a legacy field instrument in an industrial plant.

FIG. 10 illustrates a field technician who connected an example handheld communicator 1005 to a legacy field instrument in an industrial plant via a wire 1010.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method for providing BLUETOOTH Low Energy (BLE) communication capability to a legacy field instrument in an industrial control system, the method comprising:
   receiving, by a BLE adapter coupled to the field instrument via a native communication link, information from the field instrument according to a protocol that is native to the field instrument;
   converting, by the BLE adapter, the information from the native protocol into a BLE communication protocol;
   transmitting, by the BLE adapter, the converted information to an external device over a BLE communication link;
   receiving, by the BLE adapter, a BLE signal from the external device over the BLE communication link;
   converting, by the BLE adapter, the BLE signal into the native protocol; and
   transmitting, by the BLE adapter, the converted BLE signal to the field instrument over the native communication link corresponding to the native protocol.

2. The method of claim 1, wherein the native communication link includes a wireless Highway Addressable Remote Transducer (HART) communication link.

3. The method of claim 1, wherein the native communication link includes a wired hardware interface.

4. The method of claim 3, wherein the wired hardware interface includes:
   a universal asynchronous receiver/transmitter (UART) interface, or
   a Serial Peripheral Interface (SPI) interface.

5. The method of claim 1, wherein the native protocol is an industrial automation communication protocol.

6. The method of claim 5, wherein the industrial automation communication protocol includes at least one of:
   a Highway Addressable Remote Transducer (HART) protocol;
   a FOUNDATION FIELDBUS (FF) protocol; or
   a Process Field Bus (PROFIBUS) protocol.

7. The method of claim 1, wherein the external device is a mobile device.

8. An apparatus comprising:
   a communication interface configured to couple to a field instrument via a native communication link and to receive information from the field instrument according to a protocol that is native to the field instrument;
   a BLUETOOTH Low Energy (BLE) transceiver; and
   at least one computer processor operably coupled to the BLE transceiver, the at least one computer processor configured to:
   convert the information from the native protocol into a BLE communication protocol;
   control the BLE transceiver to transmit the converted information to an external device over a BLE communication link;
   receive, through the BLE transceiver, a BLE signal from the external device over the BLE communication link;
   convert the BLE signal into the native protocol; and
   transmit, through the communication interface, the converted BLE signal to the field instrument over the native communication link corresponding to the native protocol.

9. The apparatus of claim 8, wherein the native communication link includes a wireless Highway Addressable Remote Transducer (HART) communication link.

10. The apparatus of claim 8, wherein the native communication link includes a wired hardware interface.

11. The apparatus of claim 10, wherein the wired hardware interface includes:
   a universal asynchronous receiver/transmitter (UART) interface, or
   a Serial Peripheral Interface (SPI) interface.

12. The apparatus of claim 8, wherein the native protocol is an industrial automation communication protocol.

13. The apparatus of claim 12, wherein the industrial automation communication protocol includes at least one of:
   a Highway Addressable Remote Transducer (HART) protocol;
   a FOUNDATION FIELDBUS (FF) protocol; or
   a Process Field Bus (PROFIBUS) protocol.

14. The apparatus of claim 13, wherein the external device is a mobile device.

15. A system comprising:
   a field instrument configured to operate in response to control signals received from an industrial automation controller, the field instrument comprising:
   an application processor configured to output information including transmitter parameters of the field instrument, and
   a BLUETOOTH Low Energy (BLE) transceiver connected to the application processor and configured to:
   receive, by a BLE adapter coupled to the field instrument via a native communication link, information from the field instrument according to a protocol that is native to the field instrument;
   convert, by the BLE adapter, the information from the native protocol into a BLE communication protocol;
   transmit, by the BLE adapter, the converted information to an external device over a BLE communication link;
   receive, by the BLE adapter, a BLE signal from the external device over the BLE communication link;
   convert, by the BLE adapter, the BLE signal into the native protocol; and transmit, by the BLE adapter, the converted BLE signal to the field instrument over the native communication link corresponding to the native protocol.

16. The system of claim 15, wherein the BLE transceiver is a BLE system-on-chip.

17. The system of claim 15, wherein the control signals are received via a network according to industrial automation communication protocol including at least one of:
   a Highway Addressable Remote Transducer (HART) protocol;
   a FOUNDATION FIELDBUS (FF) protocol; or
   a Process Field Bus (PROFIBUS) protocol.

18. The system of claim 15, wherein the external device is a mobile device.

* * * * *